United States Patent [19]

Doi et al.

[11] Patent Number: 4,706,446
[45] Date of Patent: * Nov. 17, 1987

[54] LAWN MOWER

[75] Inventors: Hachiro Doi; Masayuki Yaegashi, both of Saitama, Japan

[73] Assignee: Fuso Keigokin Co., Ltd., Tokyo, Japan

[*] Notice: The portion of the term of this patent subsequent to Jun. 4, 2002 has been disclaimed.

[21] Appl. No.: 685,072

[22] Filed: Dec. 21, 1984

Related U.S. Application Data

[63] Continuation of Ser. No. 454,328, Dec. 29, 1982, Pat. No. 4,520,619.

[30] Foreign Application Priority Data

Sep. 25, 1982 [JP] Japan .................. 57-167839

[51] Int. Cl.⁴ .......................................... A01D 34/52
[52] U.S. Cl. ..................... 56/295; 56/17.5; 56/255; 30/347
[58] Field of Search ............ 56/295, 255, 17.1, 17.2, 56/16.9, 320.2; 30/347, 240

[56] References Cited

U.S. PATENT DOCUMENTS

| | | | |
|---|---|---|---|
| 245,225 | 8/1881 | Sanford | 56/255 |
| 797,596 | 8/1905 | Neuhaus | 56/255 |
| 894,887 | 8/1908 | Holland | 56/255 |
| 1,130,283 | 3/1915 | Hewett et al. | 56/255 |
| 1,799,714 | 4/1931 | Wallace | 56/17.1 |
| 1,876,504 | 9/1932 | Rossiter et al. | 56/255 |
| 2,532,174 | 11/1950 | Lieberman | 56/255 |
| 2,598,091 | 5/1952 | Ahlgrim | 56/295 |
| 2,630,665 | 3/1953 | Lauer | 56/295 |
| 2,877,617 | 3/1959 | Horner, Jr. | 56/16.9 |
| 2,976,665 | 3/1961 | Speckman | 56/255 |
| 3,118,268 | 1/1964 | Benz | 56/255 |
| 3,135,081 | 6/1964 | Booth | 56/255 |
| 3,148,490 | 9/1964 | Chadwick | 56/320.2 |
| 3,221,481 | 12/1965 | Mattson et al. | 56/16.9 |
| 3,273,239 | 9/1966 | Hill | 56/255 |
| 3,332,147 | 7/1967 | Legge | 56/295 |
| 3,618,304 | 11/1971 | Handhausen | 56/295 |
| 3,754,386 | 8/1973 | Armstrong | 56/320.2 |
| 3,781,991 | 1/1974 | Stretton | 56/295 |
| 4,250,699 | 2/1981 | Hallberg | 56/295 |
| 4,277,937 | 7/1981 | Luick | 56/255 |
| 4,310,999 | 1/1982 | Onoue | 56/295 |
| 4,520,619 | 6/1985 | Doi et al. | 56/256 |

Primary Examiner—Gene Mancene
Assistant Examiner—John Weiss
Attorney, Agent, or Firm—Sandler & Greenblum

[57] ABSTRACT

A lawn mower having a housing and a cutter unit positioned below the housing. The cutter unit comprises an upper rotating cutting unit and a lower stationary cutting unit that is concentric with the upper cutting unit and which have a plurality of upper and lower blades at their borders. Each blade has a cutting surface with a near end close to the border, and a far end away from the border. The blades of the upper cutting unit extend in front of a line passing through the concentric axis and the near end, in the direction of rotation of the upper cutting unit.

The upper blades rotate and slide over stationary lower blades, thereby cutting the lawn in a manner similar to a pair of scissors. The angle between the upper and lower blades is preferably 16-20 degrees.

The diameter of the upper cutting unit is greater than or equal to the diameter of the lower cutting unit, and the distance from the axis to the far end of the upper blades is greater than or equal to the distance from the axis to the far end of the lower blades. In addition, the lower blades, transverse to the direction of travel of the mower are more closely spaced and more numerous than in the direction of travel.

The lower cutting unit is prevented from rotating by a supporting arm, attached to the bottom of the housing, and having projections which engage openings in the lower cutting unit. The supporting arm and lower cutting unit can be rotated 90 degrees to accommodate a change in the direction of travel of the mower.

In another embodiment, a plurality of cutter units, all in the same plane, can be provided, along with a supporting plate for preventing the lower cutting units from rotating.

32 Claims, 13 Drawing Figures

LAWN MOWER

This is a continuation of application Ser. No. 454,328, filed Dec. 29, 1982, now U.S. Pat. No. 4,520,619.

FIELD OF THE INVENTION

This invention relates to a lawn mower having a cutter unit including upper and lower concentric cutting units which are each provided with a plurality of blades.

BACKGROUND OF THE INVENTION

Conventional lawn mowers having upper and lower cutting units are manufactured so that the blades of the upper and/or lower cutting units are in the shape of saw-teeth or comb-teeth which project away from the axis around which the units rotate. Because of their shape the blades do not uniformly and smoothly cut the lawn at right angles to the direction in which the mower travels. As a consequence, the mowing area is small compared to the size of the upper or lower cutting units. Furthermore, the lawn is mown unevenly and, therefore, the mowed area is irregular and not uniform. In addition, such a mower does not cut the lawn sharply. Finally, the lawn that is taken in between the two blades is apt to slip out of the space between the two blades and, therefore, the mowing efficiency is low.

In order to overcome the drawbacks mentioned above, these lawn mowers have been redesigned so that both blades slide in parallel, on top of each other. Such a mower, however, has additional disadvantages. For example, it is difficult to position the blades so that they slide close to each other. Furthermore, the blades are apt to bite each other and therefore they are often damaged. In addition, because the load applied to the mower fluctuates, depending on the amount of the law cut by the blades, a large prime mover or motor is necessary to power the mower.

The conventional mower of the type mentioned above, has a vertical shaft which supports the upper and lower cutting units. Thus, the cutting units are suspended from the shaft and therefore, they are apt to rock. When rocking of the blades occurs, the height of the lawn that is mowed becomes uneven. Furthermore, when two or more of such cutting units are arranged in the same plane, there is often a space on the lawn which is left unmowed between the units, or the cutting units may come into contact with each other and break. Furthermore, when a supporting arm is provided to prevent rocking of the cutter units, the screws for attaching the cutter units to the supporting arm are apt to become loose due to the sliding movement of the cutter units when they mow the lawn. As a consequence, the cutter units rotate and become defective. It is therefore an object of the present invention to provide a lawn mower having blades that cut the lawn sharply and do not rock, that smoothly cut grass at right angles to the mowing direction, and that cut the lawn uniformly without the blades becoming damaged.

SUMMARY OF THE INVENTION

According to the invention, the lawn mower comprises a housing and a cutter unit positioned below the housing. The cutter unit includes a lower cutting unit having at least one lower blade thereon, and an upper cutting unit, coaxial with the lower cutting unit around an axis and adapted to rotate in a direction t. The upper cutting unit includes at least one upper blade thereon, and a cutting surface on the blade having a near end. The upper blade extends in front of a line passing through the axis and the near end, in the direction t. The upper and lower cutting units may further include a border. The blades are attached at the border to the upper and lower cutting units. The lawn mower may further include a prime mover, in the housing, for rotating the lower blade, and the upper and lower cutter units may further include a plurality of blades. The crossing angle between the upper blade and the lower blade is between approximately 16-20 degrees. In addition, the mower may comprise a plurality of cutter units.

The upper and lower blades have a cutting surface with a near end, and a far end which is further away from the point at which the blades are attached to their respective borders than the near end. The distance from the axis to the far end of the upper blade is substantially equal to or greater than the distance from the axis to the far end of the lower blade. In addition, the distance from the axis to the border of the upper cutting unit is substantially equal to or greater than the distance from the axis to the border of the lower cutting unit. Furthermore, the blade density of the lower cutting unit in the direction transverse to the movement of the mower is sufficiently greater than the blade density of the lower cutting unit in the direction of movement of the mower, such that a lawn of uniform height over the entire area covered by the cutting unit is produced.

In another embodiment, the lawn mower includes a housing and a cutter unit. The cutter unit includes an upper cutting unit below the housing, and a lower cutting unit below the housing, coaxial with the upper cutting unit, and adapted to cooperate with the upper cutting unit to cut a lawn. A supporting arm is attached to the housing and is adapted to prevent the lower cutting unit from rotating. A fixed shaft is attached to the lower cutting unit, and the supporting arm is attached to the fixed shaft and the bottom of the housing. A prime mover is also included in the housing, for rotating the upper cutting unit.

The lower cutting unit contains at least one opening therein, and the supporting arm includes at least one projection thereon for engaging the opening in the lower cutting unit. The projection has an opening therein which is adapted to allow grass which has become positioned between the upper and lower cutting units to fall therethrough. The supporting arm may be U-shaped in cross-section, with the leg of each "U" attached to the bottom of the housing, or the supporting arm may be L shaped in cross-section. A stop is attached to the housing, which abuts the legs of the U-shaped supporting arm, and is adapted to prevent the legs from rotating. The supporting arm and the lower cutting unit are adapted to rotate through 90 degrees, and then become rigidly attached to the fixed shaft.

The lower cutting unit has a border and at least one lower blade attached to the border. The upper cutting unit is coaxial with the lower cutting unit around an axis and is adapted to rotate in direction t. The upper cutting unit includes a border, at least one upper blade attached to the border, and a cutting surface on the blade having a near end. The upper blade extends in front of a line passing through the axis and the near end, in the direction t. The crossing angle between the upper and lower blades is between approximately 16-20 degrees.

The upper and lower blades have a cutting surface with a near end, and a far end which is further away from the point at which the blades are attached to the borders than the near end. The distance from the axis to the far end of the cutting surface of the upper blade is substantially equal to or greater than the distance from the axis to the far end of the cutting surface of the lower blade. The distance from the axis to the border of the upper cutting unit is substantially equal to or greater than the distance from the axis to the border of the lower cutting unit. In addition, the upper and lower cutting units may comprise a plurality of upper and lower blades. Also, the blade density of the lower cutting unit in the direction transverse to movement of the mower is sufficiently greater than the blade density of the lower cutting unit in the direction of movement of the mower such that a lawn of uniform height over the entire area covered by the cutter unit is produced.

In another embodiment, the lawn mower comprises a plurality of cutter units in the same plane. Each of the cutter units comprises an upper cutting unit and a lower cutting unit coaxial with the upper cutting unit to cut the lawn. In addition, the mower includes a supporting plate, attached to each of the lower cutting units, and adapted to prevent the lower cutting units from rotating. A plurality of fixed shafts is also provided so that one shaft is attached to each of the lower cutting units and the supporting plate. The lower cutting units may further include at least one opening therein, and the supporting plate may include at least one projection thereon for engaging the opening, and adapted to prevent the lower cutting units from rotating. Each cutter unit has a center, and the supporting arms are positioned behind a line passing through the centers of the cutter units, on the side of the line away from the predetermined direction in which the mower moves.

In this embodiment, the lawn mower may also include a housing, with the cutter unit positioned below the housing. The lower cutting unit may have a border, and at least one blade attached to the border. The upper cutting unit, which is coaxial with the lower cutting unit around an axis, is adapted to rotate in a direction t, and also includes a border, at least one upper blade attached to the border, and a cutting surface on the blade having a near end. The upper blade extends in front of a line passing through the axis and the first end portion in the direction t. The upper and lower cutting units may include a plurality of blades, and the crossing angle between each upper blade and lower blade is between approximately 16-20 degrees. The upper and lower blades have a cutting surface with a near end, and a far end which is further away from the point at which the blades are attached to their borders than the near end. The distance from the axis to the far end of the cutting surface of the upper blade is substantially equal to or greater than the distance from the axis to the far end of the cutting surface of the lower blade. The distance from the axis to the border of the upper cutting unit is substantially equal to or greater than the distance from the axis to the border of the lower cutting unit. The blade density of the lower cutting unit in the direction transverse to the movement of the mower is sufficiently greater than the blade density of the lower cutting unit in the direction of movement of the mower such that a lawn of uniform height over the entire area covered by the cutter unit is produced.

BRIEF DESCRIPTION OF THE DRAWINGS

Embodiments of the present invention are disclosed in the accompanying drawings wherein.

DETAILED DESCRIPTION OF PREFERRED EMBODIMENTS OF THE INVENTION

Figure 1:
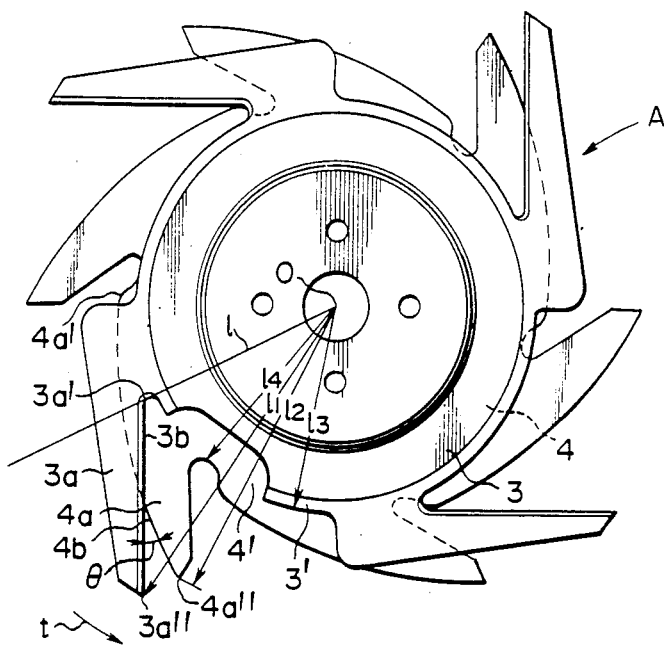
FIG. 1 is a top plan view, partially in section, of an embodiment of a cutter unit used in the lawn mower of the invention.
Figure 2:
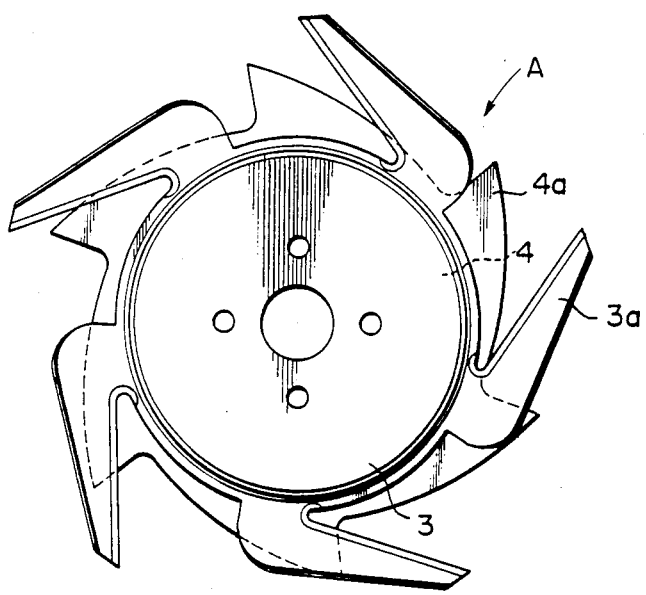
FIG. 2 is a top plan view of another embodiment of a cutter unit.

FIGS. 1-4 illustrate various embodiments of the cutter unit A of the lawn mower. Each embodiment of cutter A comprises a top cutting unit 3 and a bottom cutting unit 4. Units 3 and 4 are coaxial around a axis 0. Both top cutting unit 3 and bottom cutting unit 4 are circular and, therefore, contain circular borders 3' and 4' respectively. Attached at borders 3' and 4' are a plurality of projections or blades 3a and 4a, respectively, which contain the cutting surfaces 3b 4b and an inner edge. As illustrated in FIG. 1, the inner edge of cutter unit 3 has cutting surface 3b thereon, and the outer edge of cutter unit 4 has cutting surface 4b thereon. Cutting surface 3b starts at near end 3a' which is the point at which radial straight line 1 first intersects blade 3a, and extends in a straight line to far end point 3a'', which is further from the point at which the blade is attached to the border, than near end 3a'. Cutting surface 4b is curved and has the shape of a gently curving circle, extending in the direction of t in which the blades rotate. Alternatively cutting surface 3b can be in the shape of gently curving circle extending in the direction t of the rotating blades.

Cutting units 3 and 4 are arranged coaxially so that blades 3a and 4a slide on one another. When the two cutter units 3 and 4 are rotated in opposite directions, or when either cutter unit is rotated in direction t shown in FIG. 1 around axis 0, blades 3a and 4a snip blades of grass in a similar fashion to a scissors, thereby mowing the lawn.

The shapes and orientation of blades 3a and 4a are picked so that the crossing angle $\theta$ between blades 3a and 4a is approximately 16-20 degrees. Because the crossing angle is 16–20 degrees, blades 3a and 4a cut the grass sharply, and the grass introduced between blades 3a and 4a does not slip out of the space between blades 3a and 4a before being cut.

In one embodiment, the shape and position of blade 3a is picked first and therefore the shape and position of blade 4a is determined by blade 3a, so that the crossing angle $\theta$ is 16–20 degrees. In the embodiment shown in FIG. 1 the crossing angle is approximately 16–20 degrees and the inner edge of blade 3a has a cutting surface 3b that is linear and the outer edge of blade 4a and cutting surface 4b are in the shape of a gently sloping circle. Alternatively, blade 3a could have a cutting surface which is in the shape of a gently sloping circle and blade 4a could have a cutting surface in the shape of straight line. Or, both blades 3a and 4a could have cutting surfaces in the shape of gently sloping circle.

For safety reasons, it is preferable to rotate upper cutting unit 3 in direction t seen in FIG. 1, and to keep cutting unit 4 stationary, because a stationary lower cutting unit is less likely to injure the user. It is also preferable to rotate only the top cutting unit because it is difficult to design the structure of the mower to rotate both units in opposite directions.

In order to insure that no grass strays into the space between upper and lower cutting units 3 and 4, thereby dulling the blades, and in order to insure that blades 3a and 3b do not bite each other, the diameter $l_3$ of upper cutter unit 3, (that is, the distance from O to border 3'), is picked to be substantially equal to or greater than $l_4$, the diameter of lower cutter unit 4 (that is, the distance from O to border 4'), so that $l_3 \geq l_4$. In order to insure that the grass will always be taken in between blades 3a and 4a, the diameter of upper cutter unit 3 is chosen so that the length $l_1$ (the distance between O axis and the far end 3a'' of blade cutting surface 3b) is substantially equal to or greater than $l_2$ (the distance between axis O and the far end 4a'' of cutting surface 4b), so that $l_1 \, l_2$.

Figure 4:
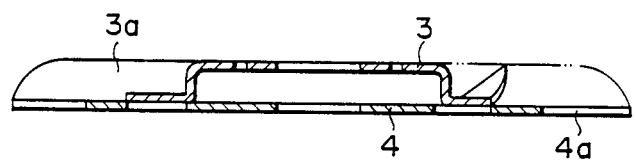
FIG. 4 is a side sectional view of the cutter unit along line IV-IV of FIG. 3.

As seen in FIG. 4, cutting surface 3b of upper cutting unit 3 is turned slightly upward so that cutting surface 3b slides close to cutting surface 4b of lower cutting unit 4.

Figure 3:
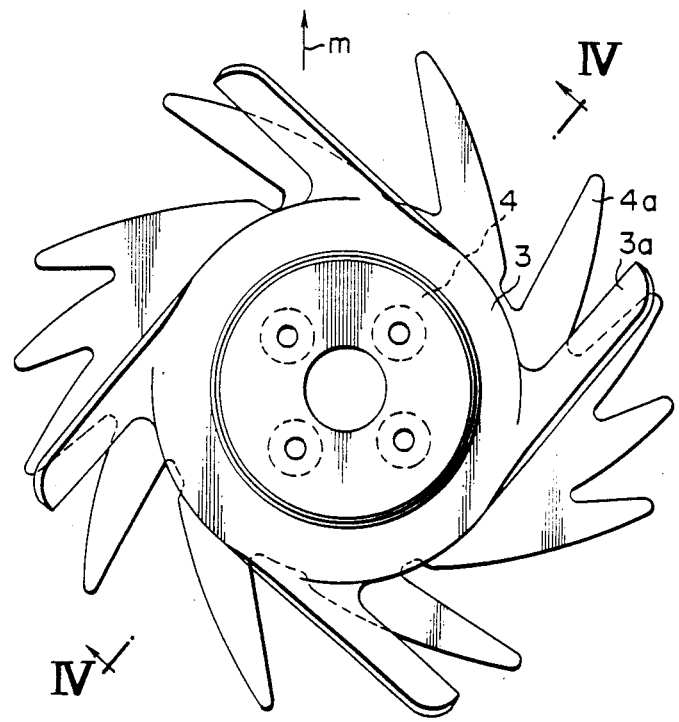
FIG. 3 is a top plan view of still another embodiment of a cutter unit.

Because the direction in which the mower moves is predetermined (for example, in the direction m in FIG. 3), there is no need to have blades of the same shape in order to cut the grass to a uniform height, as long as the crossing angle is between 16–20 degrees, and, one of the two cutting units does not rotate. For example, the embodiments illustrated in FIGS. 3 and 4 show a lower cutter unit 4 that is fixed, and an upper cutting unit that is rotatable. Furthermore, lower cutter unit 4 is provided with dense teeth (i.e., closel spaced teeth) on the right and left sides thereof, and thin teeth (i.e., widely spaced teeth) on the front and rear portions thereof. If the lawn mower is moved in the front direction (e.g., direction m in FIG. 3), the grass directly in front of the mower will be cut by blades at the front and the rear of the mower. Grass that is not directly in front of the mower will only be cut by one set of blades -- those on the right or left side of the mower ($m_1$, in FIG. 5, $m_2$ in FIG. 7). In order to cut the same amount of grass so as to produce a lawn of uniform height, the lower blades in the direction transverse to the movement of the mower are more numerous and more closely spaced than lower blades positioned in the direction of movement of the mower; thus grass is introduced smoothly into the mower, and the same quantity of grass is cut in front of and on each side of the mower so as to produce a lawn of uniform height.

Figure 5:
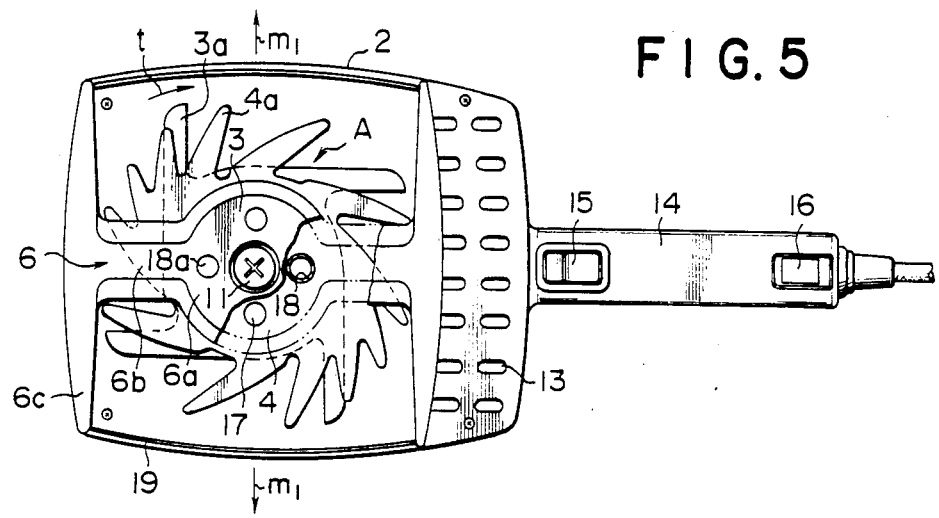
FIG. 5 is a bottom view, partially in section, of an embodiment of the lawn mower according to the invention.
Figure 6:
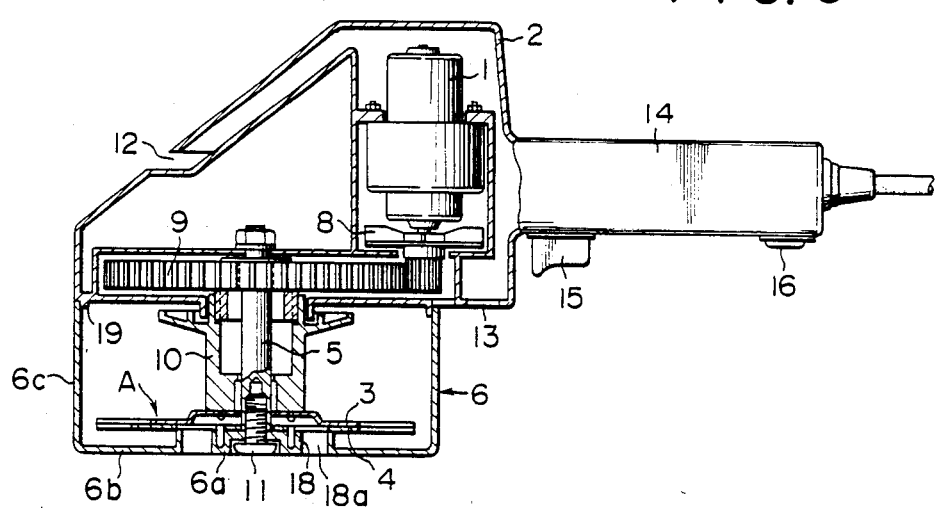
FIG. 6 is a side view, partially in section, of the embodiment shown in FIG. 5.
Figure 7:
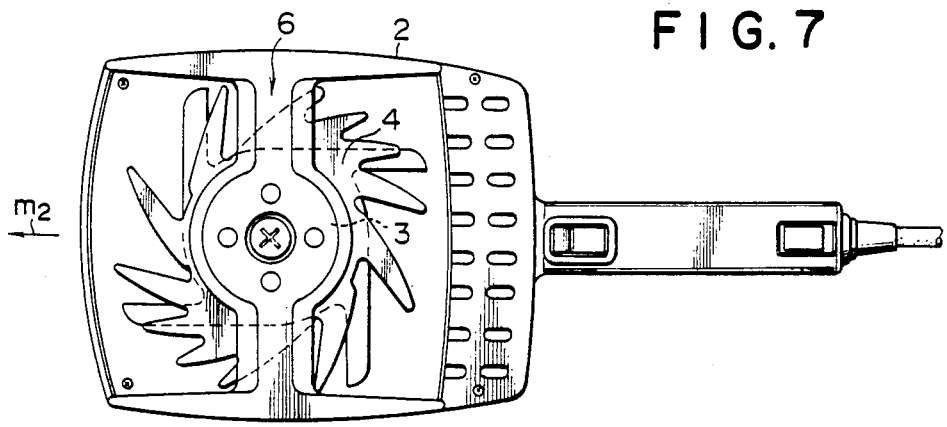
FIG. 7 is a bottom view of the embodiment of the mower showing a supporting arm that has been rotated 90 degrees together with a lower blade.
Figure 8:
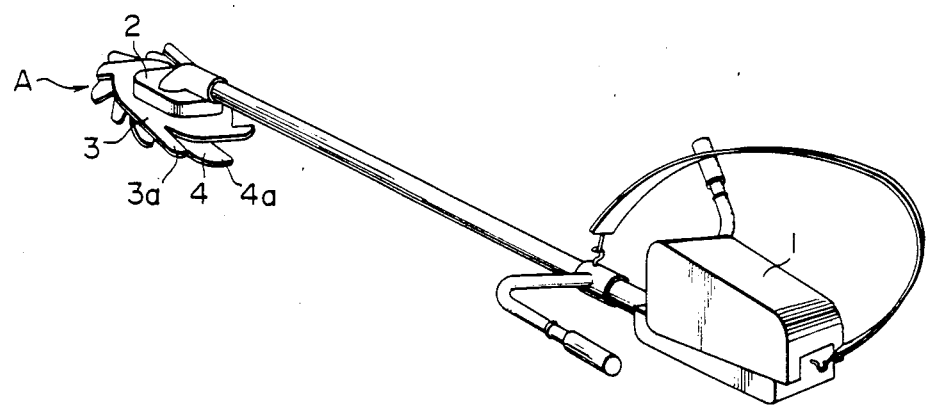
FIG. 8 is a perspective view of an embodiment of a mower which mows weeds according to the invention.
Figure 9:
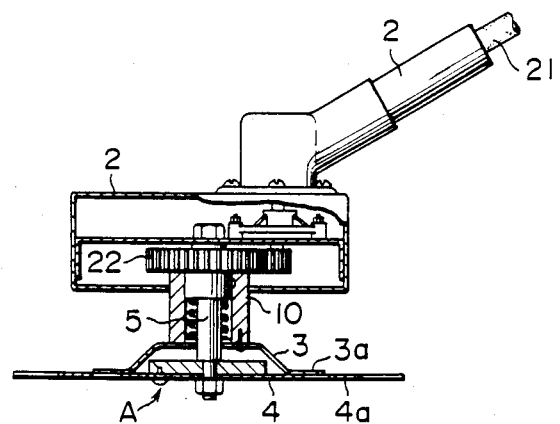
FIG. 9 is a sectional side view showing the mower shown in FIG. 8.
Figure 10:
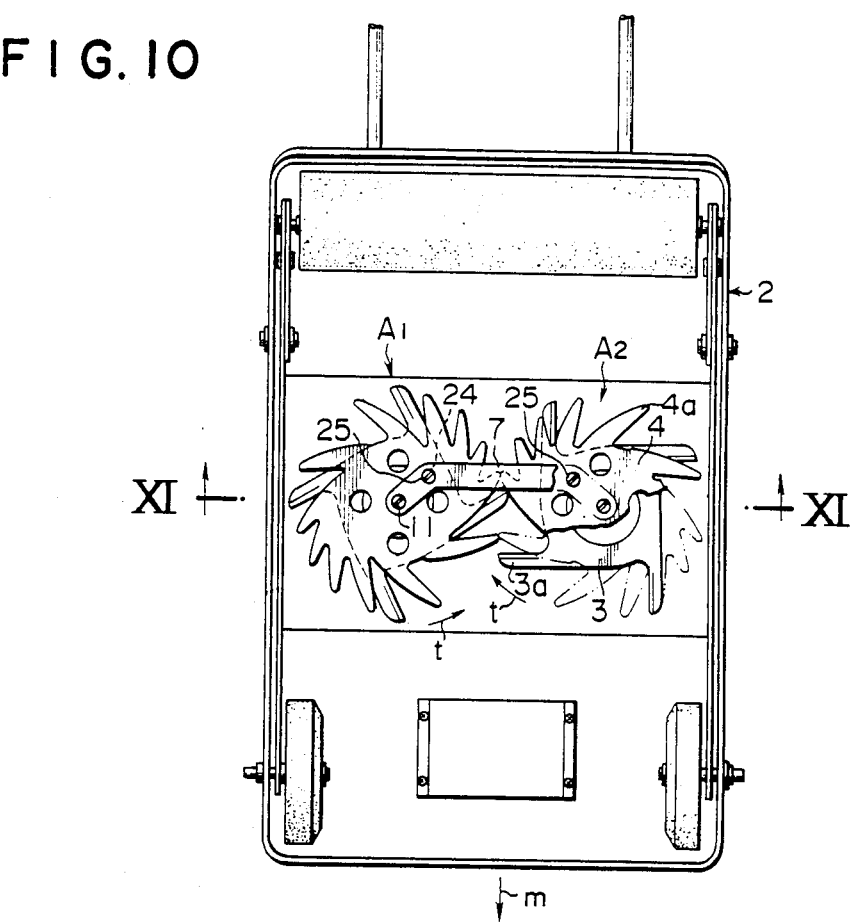
FIG. 10 is a bottom view, partially cut-away of an embodiment of the lawn mower of the invention.
Figure 11:
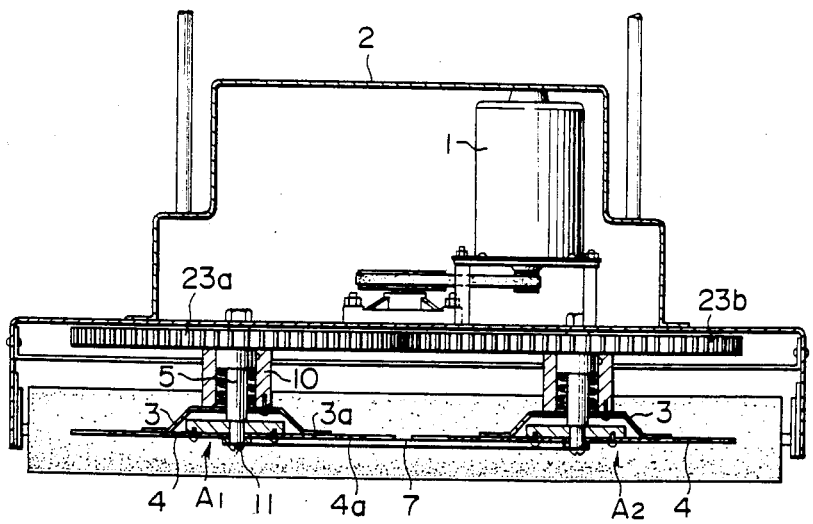
FIG. 11 is a sectional side view of the mower along the line XI—XI of FIG. 10.
Figure 12:
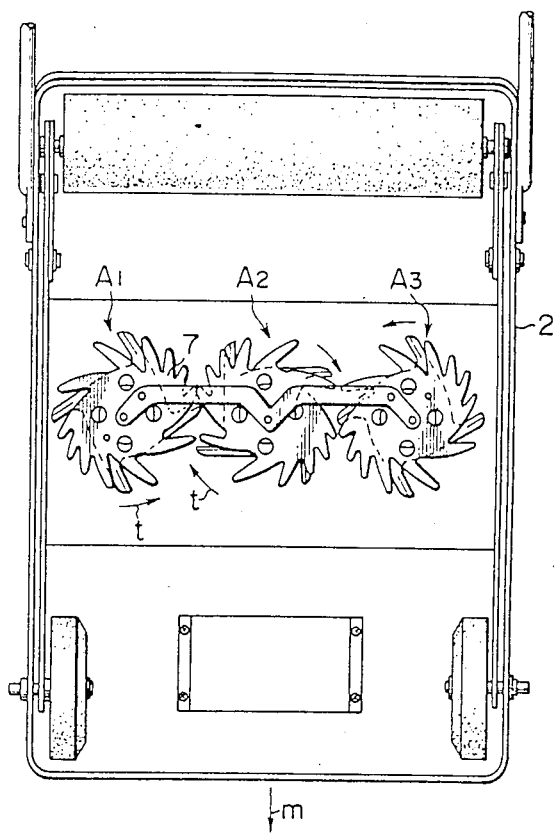
FIG. 12 is a bottom view of another embodiment of the lawn mower of the invention.
Figure 13:
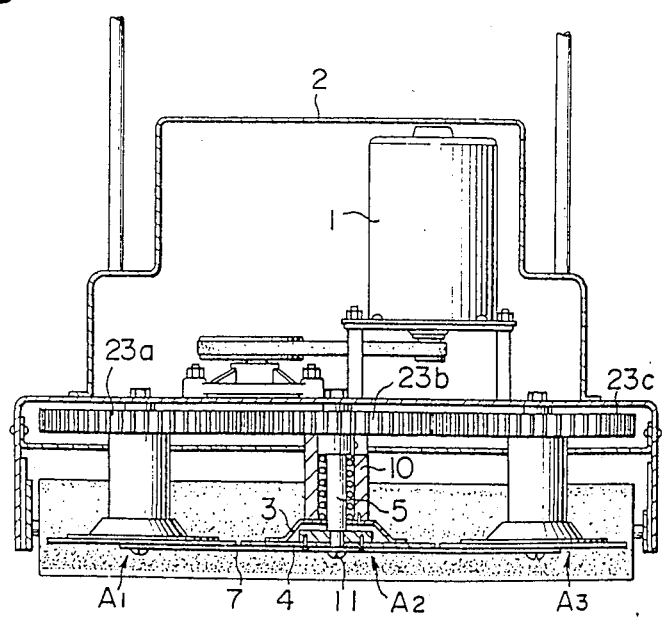
FIG. 13 is a side view, partially cut-away, of the mower shown in FIG. 12.

Thus, cutter unit A comprises an upper cutting unit 3 and a lower cutting unit 4. Blade 3a of the upper cutting unit 3 slides on blade 4a of lower cutting unit 4 from points 3a', 4a' to 3a'', 4a'', respectively, and as blade 3a rotates, blade 3a pushes grass toward blade 4a so as to cut the grass in light, quick strokes. One, or a plurality of cutter units A may be arranged in the same plane below housing 2. FIGS. 5 through 13 illustrate alternative embodiments of the mower. FIGS. 5 through 7 show a hand-operated lawn mower. FIGS. 8 and 9 show a weed mower. FIGS. 10 and 11 illustrate a mower having two cutter units A1, A2, and, FIGS. 12 and 13 show a mower provided with three cutter units A1, A2 and A3.

The hand-operated mower shown in FIGS. 5 through 7, includes a box-shaped housing 2; housing 2 in turn houses a prime mover 1, a fan 8 for cooling prime mover 1, and a driving mechanism 9 for driving the cutter unit A. Below housing 2 are provided a cutter unit A having upper and lower cutting units 3 and 4 respectively, and a supporting arm 6 for preventing lower unit 4 from being rotated.

Upper cutting unit 3 is attached to a rotary shaft 10 provided vertically below housing 2, while lower cutting unit 4 is fixedly attached to a fixed shaft 5 by a bolt 11. By connecting rotary shaft 10 to driving mechanism 9 of the prime mover 1, and by rotating upper cutting unit 3 in the direction shown by arrow t, the lawn is mown quickly and lightly by blades 3a and 4a.

As seen in FIGS. 5 through 7, the mower also includes an air inlet 12, an air outlet 13, a grip 14 formed integrally with the housing 2, an operating switch 15, and a safety stopper 16 for preventing switch 15 from being inadvertently activated.

Supporting arm 6, which prevents lower cutting unit 4 from being rotated, extends between the two sides of the bottom of housing 2 as is clear from FIG. 7. Arm 6 is connected to lower cutting unit 4 and is rigidly attached to the fixed shaft 5. Arm 6 comprises a circular center 6a, which is slightly smaller than the lower blades 4a; connections 6b, 6b positioned between the two sides of housing 2, on either side of center 6a; and legs 6c, 6c extending vertically from each end of connections 6b, 6b, so that supporting arm 6 is in the shape of a U in cross-section.

Center 6a is provided with a plurality of ring projections 18 which engaged openings 17 in lower cutting unit 4. Center 6a is rigidly attached, together with lower cutting unit 4, to the bottom of fixed shaft 5. In addition, ring projections 18 engage openings 17 in the lower cutting unit 4 so that the rotation of lower cutting unit 4 may be firmly prevented.

Openings 17 function to engage projections 18, and to decrease the weight of lower cutting unit 4. Furthermore, they function as outlets for falling grass that has inadvertently become positioned between the two cutting units 3 and 4. For this purpose, ring projections 18 of supporting arm 6 have an opening therein and are hollow so as to form outlets 18a for the grass trapped between cutter units 3 and 4.

As shown in FIG. 6, the bottom of housing 2 is provided with projections 19 which abut legs 6c, 6c so that legs 6c, 6c may not rotate. When arm 6 is rigidly attached to fixed shaft 5 by means of a bolt 11, legs 6c, 6c are fixed to the bottom of housing 2 and abut projections 19, so that the arm 6 cannot be rotated. When bolt 11 is loosened, arm 6 and lower cutter unit 4 can be rotated 90 degrees so that they may be oriented in the direction in which the mower travels, i.e., the direction shown by arrow m1 in FIG. 4 or by m2 in FIG. 7).

Alternatively, supporting arm 6 may be L shaped (not shown). In this embodiment, its leg is fixed to the bottom of the housing 2 while its center, and lower cutter unit 4 are attached to fixed shaft 5.

FIGS. 8 and 9 illustrate an embodiment of a mower which cuts weeds. It comprises an operating arm 20, provided at one end with a prime mover 1, and at the other end with a housing 2. A cutter unit A comprising upper and lower cutting units 3 and 4 is provided below housing 2.

According to this embodiment, upper cutting unit 3 is fixed to a vertical rotary shaft 10, provided within the housing 2, while lower cutting unit 4 is attached to a fixed shaft 5 which is vertically aligned with and coaxial with rotatable shaft 10. Operating arm 20 is provided therein with a transmitting mechanism 21 which transmits power generated by prime mover 1 to rotary shaft 10.

When transmitting mechanism 21 is connected to a driving mechanism housed in the housing 2, upper cutting unit 3 is rotated. Consequently, a blade 3a of rotary cutting unit 3 in combination with a blade 4a of stationary lower cutting unit 4 mows the weeds.

FIGS. 10 through 13 show hand-powered or electric powered lawn mowers. The mower is provided with a plurality of cutter units A1, A2, A3 in the same plane, and with a supporting plate 7 provided below lower cutting units 4.

Each of the upper cutting units 3 of cutter units A1, A2, A3 is attached to a rotary shaft 10 extending vertically to the bottom portion of a housing 2. Each lower cutting unit 4 is attached to the bottom of a fixed shaft 5 which is coaxial with rotary shaft 10. When rotary shafts 10 of respective cutter units A1, A2 and A3 are rotated in synchronism with each other by means of gears 23a, 23b, 23c connected to a prime mover 1, upper cutting units 3 are rotated in a direction shown by an arrow t. In this way, upper blades 3a in combination with lower blades 4a, snip blades of grass, thereby mowing the law.

Cutter units A1, A2 and A3 are positioned at the same height, separated by a predetermined distance. A support plate 7 is provided below lower cutting units 4. Support plate 7 is thin and connected together with lower cutter units 4, to respective fixed shafts 5 by bolts 11. Plate 7 is provided with projections or stopping pins 25 which engaged openings 24 in lower cutting units 4 so that cutting units 4 cannot rotate. Plate 7 is positioned behind a line which passes through the centers of respective cutter units A1, A2, and A3 on the side of the line away from the direction the mower moves, so that the lawn is not prevented from entering blades 3a and 4a by support plate 7.

To summarize, the lawn mower, according to the present invention, includes at least one cutter unit A comprising an upper cutting unit 3 provided at its circumference with a plurality of blades and a coaxial lower cutting unit 4. The blade 3a of upper cutting unit 3 is positioned in front of a line 1 in FIG. 1 (that is, on the side of line 1 in the direction in which blade 3a rotates) which starts at axis O and intersects blade 3a at near end 3a'. Blade 3a slides over blade 4a of lower cutting unit 4, from their near ends 3a', 4a' to their far ends 3a", 4a". Upper blade 3a moves in direction t, thereby pushing the grass against lower blade 4a and snipping the grass and mowing the lawn.

The lawn mower of the present invention contains a number of advantages. First, because the action of blades 3a and 4a is similar to a pair of scissors, the grass is continuously snipped, thereby producing a lawn that is beautiful to look at. Second, because the amount of lawn that is cut over time is uniform, the load applied to the mower does not fluctuate very much during its operation and therefore the power required by the motor can be reduced. Consequently, the mower can be made small and inexpensively, and therefore one can use the present invention for long periods of time without becoming tired.

Third, the upper blade can take in and cut grass at right angles to the direction in which the mower is traveling, thereby greatly improving mowing efficiency. Fourth, because it is not necessary to rotate the upper blade (or the lower blade) extremely fast, pebbles or twigs that stray into the mower will not be flipped away by the blades at high speeds. Fifth, the upper and lower blades can be easily and inexpensively produced by die-cast molding. Furthermore, their replacement and grinding can be easily effected. Sixth, because the crossing angle between the two blades is maintained constantly between 16-20 degrees, the blades sharply cut the grass, and the lawn that is introduced between the blades will not slip out.

Seventh, because the distance from axis O to the far end 3a" of blade 3a is substantially greater than or equal to the distance from axis O to the far end 4a" of blade 4a, the grass over which the mower moves is always taken in between blades 3a and 4a. Eighth, the diameter of the upper cutting unit 3 (i.e., the distance between O and border 3') is substantially equal to or greater than the diameter of lower cutting unit 4 (i.e., the distance from O to circular border 4'). Therefore, the grass cannot fall into the space between the upper and lower cutting units 3 and 4 which would produce dull blades. In addition, this insures that the two blades do not bite each other. Nineth, two or more cutter units can be arranged in the same plane, thereby allowing a broad area to be mowed, even though the frame or housing of the mower is not large.

The lawn mower of the present invention also includes a supporting arm 6 which prevents lower blade 4a from rotating and which forms the bottom of the housing. Supporting arm 6 gives the present invention a number of additional advantages. The lower blade is much less likely to break down due to long use and, therefore, maintenance and inspection are not necessary for long periods of time. In addition, the supporting arm functions as a guide sledge when the mower moves over the lawn. This is especially important in a handoperated mower, which can consequently be operated with ease. Furthermore, the supporting arm protects the operator from being injured by the cutter unit. Finally, because supporting arm 6 together with the lower blade 4a can be rotated by 90 degrees, a uniform, smooth and beautiful mown lawn is obtained, even if the direction of the mower is changed.

The lawn mower may also include a supporting plate which functions as a bridge between a plurality of lower cutting units arranged in the same plane.

Because each of the lower cutting units is prevented from rotating by the supporting plate, the lower cutting units will not rotate and thereby break down even if the mower is used over a long period of time. In addition, the supporting plate allows a plurality of cutter units to be supported in a stable fashion at predetermined positions so that they will not rock during operation. Furthermore, because the cutter units are arranged close to each other, the lawn will not be mown unevely or irregularly.

The present invention has been so far described with particular reference to several illustrative embodiments thereof, but it will be understood that variations and modifications can be effected without departing from the true spirit of the present invention as described hereinabove and as defined in the appended claims.

What is claimed is:

1. A lawn mower comprising: a cutter unit including:
   (a) a lower cutting unit having at least one lower blade having a cutting surface, said blade being attached to said lower cutting unit; and
   (b) an upper cutting unit coaxial with said lower cutting unit around an axis, wherein said upper cutting unit is adapted to rotate in a direction t around said axis and wherein said upper cutting unit comprises: at least one upper blade thereon, and a cutting surface on said upper blade, having a first end and an second end, wherein said first end is closer to said axis than said second end, wherein said upper blade cutting surface extends in front of a line passing through said axis and said first end, in said direction t, wherein the crossing angle between said upper blade cutting surface and said lower blade cutting surface is between approximately 16 and 20 degrees, and means for maintaining said angle between said blades within a range between 16 and 20 degrees during rotation of one of said cutting units, wherein one of said blades has a linear cutting surface and wherein the other of said blades has an arcuate cutting surface.

2. The lawn mower of claim 1 further including a housing, wherein said cutter unit is positioned below said housing.

3. The lawn mower of claim 1 wherein said upper and lower cutting units include a border and wherein said blades are attached at said border to said upper and lower cutting units.

4. The lawn mower of claim 1 wherein said upper and lower cutting units further includes a plurality of blades.

5. The lawn mower of claim 2 further including a prime mover, in said housing for rotating said upper blade.

6. The lawn mower of claim 3 wherein said upper and lower blades have a cutting surface with a near end, and a far end that is further away from the point at which said blades are attached to their respective borders, then said near end, wherein the distance from said axis to said far end of said upper blade is substantially equal to or greater than the distance from said axis to said far end of said lower blade.

7. The lawn mower of claim 3 wherein the distance from said axis to said border of said upper cutting unit is substantially equal to or greater than the distance from said axis to said border of said lower cutting unit.

8. The lawn mower of claim 1 comprising a plurality of cutter units.

9. The lawn mower of claim 4 wherein the blade density of said lower cutting unit in the direction transverse to the movement of said mower is sufficiently greater than the blade density of said lower cutting unit in the direction of movement of said mower such that a lawn of uniform height over the entire area covered by said cutter unit is produced, wherein said blade density of said lower cutting unit is defined as the number of blades in a particular direction over a unit length in that direction.

10. A lawn mower in accordance with claim 1 wherein said lower blade cutting surface is circular and said upper blade cutting surface is linear.

11. A lawn mower in accordance with claim 1 wherein said upper blade cutting surface is circular and said lower blade cutting surface is linear.

12. A lawn mower comprising:
   (a) a plurality of cutter units in the same plane, each of which comprises:
      (i) an upper cutting unit having a cutting surface;
      (ii) a lower cutting unit having a cutting surface, wherein said lower cutting unit is coaxial with said upper cutting unit around an axis and adapted to rotate in a direction t around said axis and cooperate with said upper cutting unit to cut said lawn, wherein said cutting surface on said lower cutting unit has a first end and a second end, wherein said first end is closer to said axis than said second end, wherein said cutting surface of said lower cutting unit extends in front of a line passing through said axis and said first end, in said direction t, wherein the crossing angle between said upper blade cutting surface and said lower blade cutting surface is between approximately 16 and 20 degrees, and wherein one of the cutting surfaces of said lower cutting unit and said upper cutting unit is circular, the other of said cutting surfaces being linear, said cutting surfaces together comprising means for maintaining said crossing angle between 16 and 20 degrees during rotation of one of said cutting units.

13. The lawn mower of claim 12 further including a supporting plate, attached to each of said lower cutting units and adapted to prevent said lower cutting units from rotating, wherein said lawn mower further comprises a plurality of fixed shafts, one of said fixed shafts being attached to each lower cutting unit and said supporting plate.

14. The lawn mower of claim 12 wherein said mower further comprise a supporting plate, attached to each of said lower cutting units and adapted to prevent the lower cutting units from rotating, wherein said lower cutting units further include at least one opening therein, and said supporting plates include at least one projection thereon for engaging said opening.

15. The lawn mower of claim 12 wherein said mower moves in a predetermined direction, and wherein each cutter unit has a center and a supporting arm, attached to said housing and adapted to prevent said lower cutting unit from rotating, and wherein said supporting arm is positioned behind a line passing through the centers of said cutter unit, on the side of said line away from the said direction in which said mower moves.

16. The mower of claim 12 wherein said lower cutting unit has a border and at least one lower blade attached to said border, and wherein said upper cutting unit is coaxial with said lower cutting unit around an axis, and is adapted to rotate in a direction t, and includes: a border, at least one upper blade attached to said border, a cutting surface on said blade, having a near end, wherein said upper blade extends in front of a line passing through said axis and said near end, in said direction t.

17. The mower of claim 16 wherein said upper blades have a cutting surface with a near end and a far end further away from the point at which said blades are attached to their respective borders, than said near end, wherein the distance from said axis to said far end of said cutting surface of said upper blade is substantially equal to or greater than the distance from said axis to said far end of said cutting surface of said lower blade.

18. The mower of claim 16 wherein the distance from said axis to said border of said upper cutting unit is substantially equal to or greater than the distance from said axis to said border of said lower cutting unit.

19. The lawn mower of claim 16 wherein the upper and lower cutting units comprise a plurality of upper and lower blades, where in the blade density of said lower cutting unit in the direction transverse to the movement of said mower is sufficiently greater than the blade density of said lower cutting unit in the direction of movement of said mower such that a lawn of uniform height over the entire area covered by said cutter unit is produced.

20. The lawn mower of claim 12 further comprising a housing, wherein said cutter unit is positioned below said housing, and said upper cutting unit is coaxial with said lower cutting unit around an axis and further includes a border and at least one upper blade attached to said border, and a cutting surface on said blade, having a near end wherein said upper blade extends in front of a line passing through said axis and said near end, in said direction t.

21. The lawn mower of claim 20 wherein said upper and lower cutting units further includes a plurality of blades.

22. The lawn mower of claim 20 wherein said upper and lower blades have a cutting surface with a near end and a far end that is further away from the point at which said blades are attached to said borders than said near end, wherein the distance from said axis to said far end of said upper blade is substantially equal to or greater than the distance from said axis to said far end of said lower blade.

23. The lawn mower of claim 20 wherein the distance from said axis to said border of said upper cutting unit is substantially equal to or greater than the distance from said axis to said border of said lower cutting unit.

24. The lawn mower of claim 24 wherein the blade density of said lower cutting unit in the direction transverse to the movement of said mower is sufficiently greater than the blade density of said lower cutting unit in the direction of movement of said mower such that a lawn of uniform height over the entire area covered by said cutter unit is produced.

25. A lawn mower in accordance with claim 12 wherein said lower blade cutting surface is circular, and said upper blade cutting surface is linear.

26. A lawn mower in accordance with claim 12 wherein said upper blade cutting surface is circular, and said lower blade cutting surface is linear.

27. A weed cutter comprising
(a) an upper cutting unit;
(b) a lower cutting unit, below said upper cutting unit, wherein said upper and lower cutting units each comprise a blade, wherein the crossing angle between said blade cutting surfaces is approximately 16 and 20 degrees, wherein one of said blades has an arcuate cutting surface and the other of said blades has a linear cutting surface, wherein the shape of said blade cutting surfaces comprise means for maintaining said crossing angle at between 16 and 20 degrees during rotation of one of said cutting units;
(c) a motor for driving said upper cutting unit and comprising means for being carried by a user;
(d) means for supporting said upper and lower cutting units, wherein said upper and lower cutting units extend beyond said support in a horizontal plane;
(e) means for operatively connecting said motor to said upper cutting unit;
(f) a rotating shaft, attached to said support means and said connecting means, for rotating said upper cutting unit; and
(g) a fixed shaft, coaxial with and vertically aligned with said rotating shaft, and connecting said lower cutting unit to said support means for maintaining said lower cutting unit in a stationary position with respect to said support means.

28. The cutter defined by claim 27, wherein said rotating shaft has a substantially vertical opening therein, and wherein said fixed shaft is disposed in said opening.

29. The cutter defined by claim 28, wherein said upper and lower cutting units comprise upper and lower blades, respectively, which extend beyond said support means, in a horizontal plane.

30. The cutter defined by claim 24 wherein said upper cutting unit is coaxial with said lower cutting unit around an axis, wherein said upper cutting unit is adapted to rotate in a direction t around said axis and wherein said upper cutting unit comprises a cutting surface on said blade, having a first end and a second end, wherein said first end is closer to said axis than said second end, wherein said cutting surface extends in front of a line passing through said axis and said first end, in said direction t.

31. A lawn mower in accordance with claim 27 wherein said lower blade cutting surface is circular and said upper blade cutting surface is linear.

32. A lawn mower in accordance with claim 27 wherein said upper blade cutting surface is circular and said lower blade cutting surface is linear.

* * * * *

UNITED STATES PATENT AND TRADEMARK OFFICE
CERTIFICATE OF CORRECTION

PATENT NO. : 4,706,446

DATED : November 17, 1987

INVENTOR(S) : Hachiro DOI et al.

It is certified that error appears in the above-identified patent and that said Letters Patent is hereby corrected as shown below:

In column 3, line 22, insert ---and adapted to cooperate--- after "unit" (second occurrence);
Column 4, line 40, change "a" to ---an---;
Column 4, line 45, change "3b 4b and an inner edge" to ---3b and 4b of cutter A. Each blade contains an outer edge and an inner edge---;
Column 5, line 39, insert ---2--- after "1";
Column 5, line 54, change "closel" to ---closely---;
Column 7, line 68, remove the italics from "Upper blade 3a";
Column 8, line 41, change "Nineth" to ---Ninth---;
Column 9, line 24, change "an" to ---a---;
Column 11, line 46, (claim 24, line 1), change "24" to ---21---; and
Column 12, line 39 (claim 30, line 1), change "24" to ---29---.

Signed and Sealed this

Sixth Day of September, 1988

Attest:

DONALD J. QUIGG

*Attesting Officer*

*Commissioner of Patents and Trademarks*